C. A. SIMMONS.
SEAL LOCK.
APPLICATION FILED JULY 26, 1909.
971,571.
Patented Oct. 4, 1910.
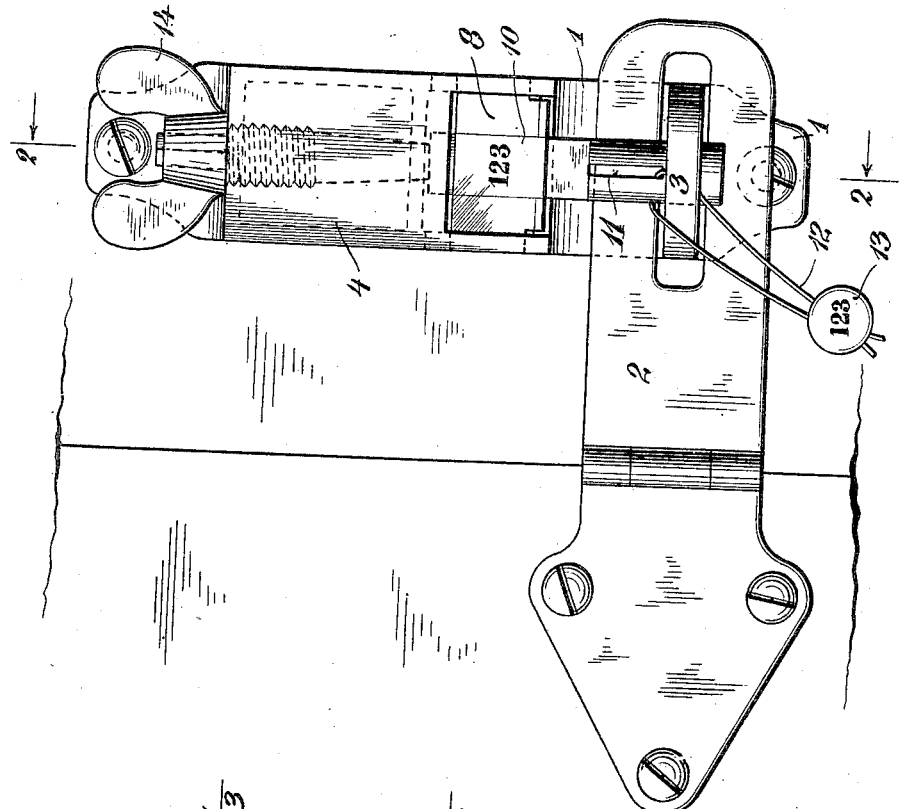
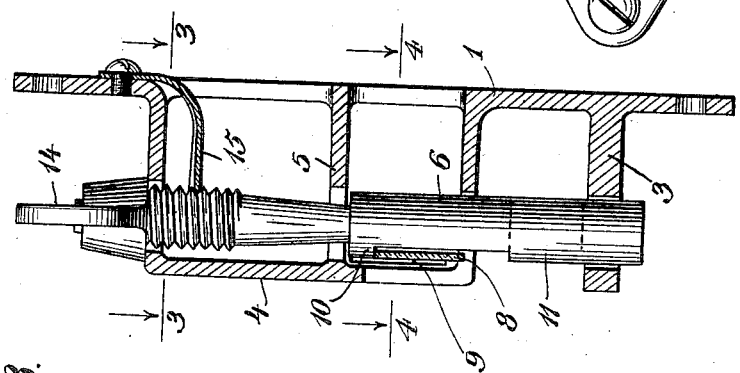
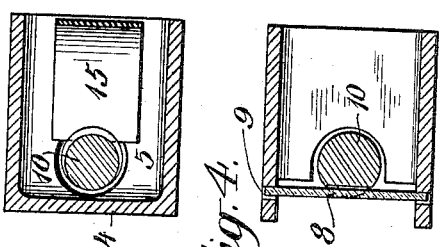
WITNESSES:
INVENTOR
Charles A. Simmons
BY
ATTORNEYS

UNITED STATES PATENT OFFICE.

CHARLES A. SIMMONS, OF ALBANY, NEW YORK.

SEAL-LOCK.

971,571.

Specification of Letters Patent.

Patented Oct. 4, 1910.

Application filed July 26, 1909. Serial No. 509,652.

*To all whom it may concern:*

Be it known that I, CHARLES A. SIMMONS, a citizen of the United States, residing at Albany, county of Albany, and State of New York, have invented certain new and useful Improvements in Seal-Locks; and I do hereby declare the following to be a full, clear, and exact description of the invention, such as will enable others skilled in the art to which it appertains to make and use the same.

The object of the invention is to provide an improved seal-lock of the type commonly employed to lock the doors of freight cars, the seal lock being so constructed that it can be opened, after the rupture of the seal, only by an operation which occupies a substantial time, so as to render more difficult the unauthorized opening of the car while in transit.

The particular nature of the improvements will be understood from the following description and the accompanying drawings, in which—

Figure 1 is a view in elevation of the seal-lock applied to a car door; Fig. 2 is a vertical section of the seal-lock taken on the line 2—2 of Fig. 1; Fig. 3 is a sectional plan on the line 3—3 of Fig. 2, and Fig. 4 is a sectional plan on the line 4—4 of Fig. 2.

The seal-lock comprises a plate 1 adapted to be screwed or bolted in place in proximity to the hasp 2 and carrying a staple 3 over which the hasp fits. The plate 1 also carries a housing 4, which may conveniently be cast integral with the plate, and which is divided into an upper and lower chamber by the partition 5 having a passage for the bolt 6. The front of the lower chamber of the housing is cut away to form an opening to display the frangible seal 8, the shoulders of which rest in slots 9 in the sides of the housing, and bolt 6 has a flattened portion in which the seal lies; the length of the slots 9, and the relative sizes of the parts, being such that when bolt 6 is lifted the seal may be laid into the slots, where it is held, when bolt 6 is depressed, as shown in the drawings, by the shoulder 10 at the upper proximity of the flattened portion. Bolt 6 may furthermore conveniently be provided with a slot 11 adapted to receive the wire 12 of the ordinary metal seal 13 if for any reason it is desirable to use such seal in substitution for or addition to the seal lock. The bolt 6 terminates at its upper end in a thumb-piece 14, and its upper portion, within housing 4, is threaded and engaged by a bent spring 15 fastened to plate 1 as shown best in Fig. 2. The upper threaded portion of the stem is preferably made of slightly smaller diameter than the main body of the bolt 6, and the opening in the top of casing 4 is of such size that the main body portion of the bolt cannot pass through it, the entire removal of the bolt from the housing being thus prevented; and the cut-away portion of the bolt preferably terminates above the staple 3 so that the bolt has a good bearing in the opening in the staple and the tendency to break the seal by jarring of the bolt is lessened.

In operation after bolt 6 has been raised sufficiently to permit the hasp 2 to be laid over staple 3, the frangible seal 8, which may be made of glass, porcelain, baked clay or the like, and which may bear a record number, is laid in place with its shoulders resting on the bottoms of the slots 9. Bolt 6 may then be pressed into place by hand or by a blow on thumb-piece 14, and under such pressure or blow spring 15 will yield readily, so that the parts come into the position illustrated in Fig. 2, where the bottom of the thumb-piece is resting on the top of housing 4 and shoulder 10 is just above the upper edge of seal 8 to hold it in place. On attempting to withdraw the bolt the spring 15 will not yield to permit the upward movement, but acts as an abutment forming a portion of a male thread so that the bolt can be withdrawn only by rotating it on its vertical axis. The first portion of the rotation serves to break the seal in a well-known manner, but the bolt cannot be immediately withdrawn after the seal is broken, as in the ordinary form of such seal locks. On the contrary the bolt can be withdrawn only by turning it repeatedly on its axis until the entire threaded portion of the stem has passed the bent spring 15. The number of turns which must be made in order to withdraw the bolt can be determined at will by determining the length of that portion of the stem which is threaded, and in this way the length of time required to open the lock can be fixed.

I am aware that it is old to provide seal-locks in which the seal is supported in proximity to the locking bolt so that the rotation of the bolt breaks the seal, but so far as I am aware it is broadly new to provide in connection with such locks mechanism whereby the bolt must be turned through a number of complete rotations before it can be withdrawn, thereby introducing a considerable time element into the operation of unlocking the car, so that the unauthorized opening of the car in transit is rendered more difficult. The importance of this will be appreciated when the fact is recalled that most of the breaking open of sealed cars which now occurs is necessarily done when the cars are standing in fairly conspicuous places in the yards, or when the cars are in motion, so that the time available to the thief for removing the bolt without detection or interruption is limited.

What I claim is:—

1. A seal lock for car doors having a rotatable bolt and a frangible seal in position to be broken by the turning of the bolt, in combination with bolt retaining mechanism one of whose elements rotates with the bolt and is moved out of locking engagement with the other element by repeated rotations of the bolt, whereby a considerable time is required to open the lock; substantially as described.

2. A seal-lock for car doors having a rotatable bolt with a threaded stem and a frangible seal in position to be broken by the turning of the bolt, in combination with an abutment forming a portion of a male thread and engaging the threaded stem, to the end that the bolt may be withdrawn only by rotating it repeatedly; substantially as described.

3. The combination in a lock for car doors of a threaded locking-bolt 6 and a bent spring 13 engaging the threads of the bolt, whereby the spring yields to the inward movement of the bolt but restrains the outward movement; substantially as described.

In testimony whereof I affix my signature, in presence of two witnesses.

CHARLES A. SIMMONS.

Witnesses:
LAURA B. PENFIELD,
WILLIAM D. BREYER.